US005764427A

United States Patent [19]
Sasaki

[11] Patent Number: 5,764,427
[45] Date of Patent: Jun. 9, 1998

[54] MAGNETIC RECORDING METHOD AND DEVICE FOR MAGNETIC RECORDING BINARY CODE DATA ON PHOTO FILM

[75] Inventor: Wataru Sasaki, Saitama, Japan

[73] Assignees: Fuji Photo Film Co., Ltd., Kanagawa, Japan; Fuji Photo Optical Co., Ltd., Saitama, Japan

[21] Appl. No.: 729,685

[22] Filed: Oct. 7, 1996

[30] Foreign Application Priority Data

Oct. 9, 1995 [JP] Japan ................. 7-261776

[51] Int. Cl.$^6$ ................. G03B 31/00; G11B 5/09
[52] U.S. Cl. ................. 360/3; 360/39; 360/48; 360/51
[58] Field of Search ................. 360/3, 39, 40, 360/48, 51, 69, 73.01, 73.04

[56] References Cited

U.S. PATENT DOCUMENTS 5,294,949  3/1994  Robinson et al. ................. 360/48 X

FOREIGN PATENT DOCUMENTS

7-199324  8/1995  Japan.

Primary Examiner—Muhammad N. Edun
Attorney, Agent, or Firm—Sughrue, Mion, Zinn, Macpeak & Seas, PLLC

[57] ABSTRACT

A magnetic recording method for recording binary code data on magnetic recording tracks formed with a constant length on photo film. Each bit of the binary code data is recorded as a bit segment constituted of a first kind magnetic zone and a second kind magnetic zone magnetized in reverse to the first kind magnetic zone. The first kind magnetic zone has a shorter length of less than 50% of the bit segment or a longer length of more than 50% of the bit segment depending upon which binary value is assigned to the bit segment. The length of each bit segment is determined for each magnetic recording track based on a total number of bits of binary code data to be recorded on that magnetic recording track, such that as the total bit number decreases, the number of bits to be recorded per unit length decreases. Also, the percentage in length of the first kind magnetic zone is adjusted to be closer to 50% of the bit segment for both binary values, as the total bit number increases.

11 Claims, 9 Drawing Sheets

MAGNETIC RECORDING METHOD AND DEVICE FOR MAGNETIC RECORDING BINARY CODE DATA ON PHOTO FILM

BACKGROUND OF THE INVENTION

1. Field of the Invention

The present invention relates to a magnetic recording method and a magnetic recording device therefor. More particularly, the invention relates to a magnetic recording method and a magnetic recording device in which binary code data is recorded on a photo film while the film is advanced frame by frame.

2. Description of the Related Art

A recording device is known which records on a photo film photographic information such as a shutter speed and an aperture value, as well as print information such as print number and trimming range and so forth. The recorded information is read during a photofinishing process at a laboratory to control the print exposure or the print format. It has also been suggested to provide a magnetic recording layer on a photo film and record information on the magnetic recording layer by use of a magnetic head incorporated in a camera while the photo film is advanced by one frame after exposure, or by use of a magnetic recording device installed in a photo-shop or a photofinishing lab.

Because of a larger stiffness than ordinary magnetic tapes, the photo filmstrip can be easy to curl. Therefore, the magnetic head for use in recording on the photo filmstrip should be able to keep stable contact with the filmstrip. In addition, as magnetic materials for the magnetic recording layer on the photo film cannot be provided with a high density, it is preferable in view of noise reduction to record the information in a digital fashion, i.e., as binary code data.

Figure 9:
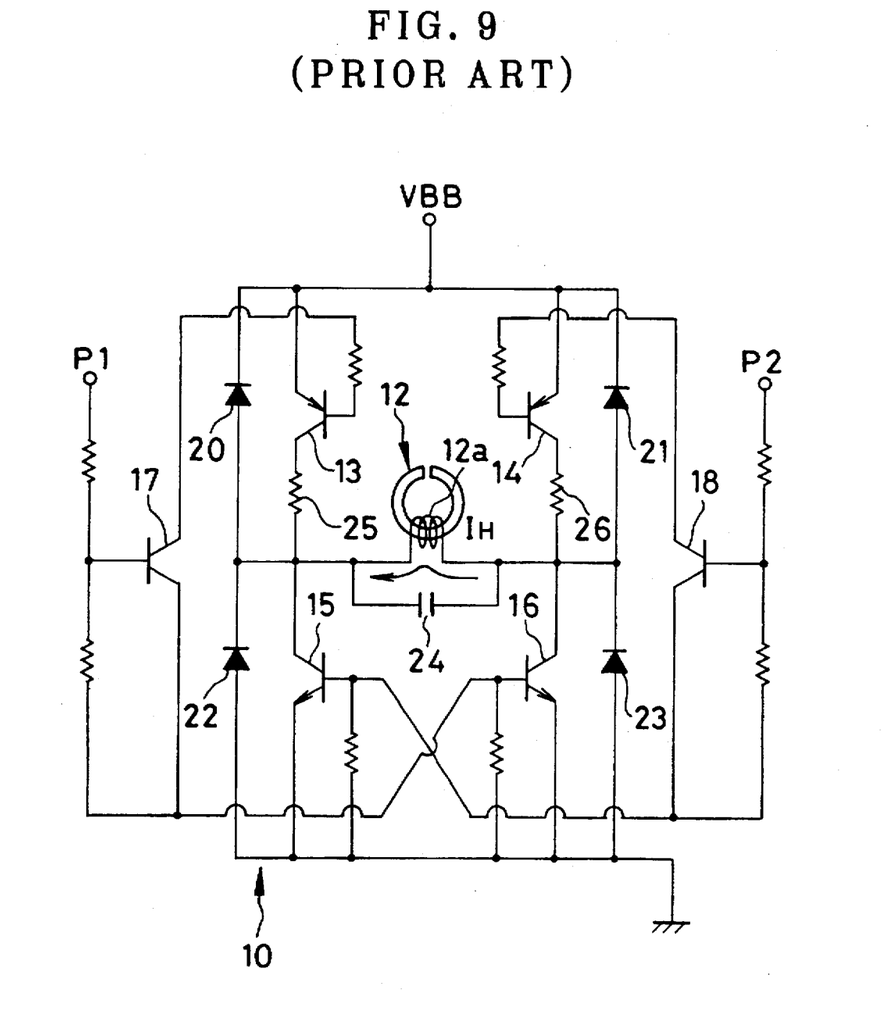
FIG. 9 shows a circuit diagram of a magnetic head driver.

FIG. 9 shows an example of magnetic head driver for the digital recording. The magnetic head driver is supplied with a power source voltage VBB. In a case where the magnetic head driver is incorporated in a camera, a lithium cell with a supply voltage of about 3 V, which originally serves as a main power source of the camera, supplies the power source voltage VBB. A magnetic head 12 is driven through switching transistors 13, 14, 15 and 16 which are connected as a bridge circuit, and control transistors 17 and 18 are connected to ON-OFF control the switching transistors 13 to 15. The control transistors 17 and 18 are turned ON in response to a switching signal applied to a first port P1 and a second port P2, respectively. Hereinafter, the switching signal applied to the first port P1 will be referred to as a first pulse signal, whereas the switching signal applied to the second port P2 will be referred to as a second pulse signal.

On the magnetic recording, when the first port P1 is set at a low level, and the second port P2 is set at a high level, the control transistor 17 is turned OFF and the control transistor 18 is turned ON, so that the switching transistors 13 and 16 are turned OFF, and the switching transistors 14 and 15 are turned ON. In result, current IH flows through a coil 12a of the magnetic head 12 in a direction shown by an arrow in FIG. 9. At that time, the magnetic head 12 generates a magnetic field in a forward direction that can be designed to correspond with a film advance direction. In this case, a zone magnetized in the film advance direction, hereinafter referred to as a forward magnetic zone, is recorded on the magnetic recording layer of the photo film.

On the other hand, when the first port P1 is set at the high level, and the second port P2 is set at the low level, the control transistor 17 is turned ON and the control transistor 18 is turned OFF, so that the switching transistors 13 and 16 are turned ON, and the switching transistors 14 and 15 are turned OFF. In result, the current IH through the coil 12a of the magnetic head 12 flows in the opposite direction to that shown by the arrow in FIG. 9. At that time, the magnetic field generated from the magnetic head 12 is directed in a reversed direction that is reverse to the film advance direction in this instance. Then, a zone magnetized in the reversed direction, hereinafter referred to as a reversed magnetic zone, is recorded on the magnetic recording layer of the photo film.

Diodes 20, 21, 22 and 23, which are respectively connected in parallel to the switching transistors 13 to 14, function as flywheel diodes for preventing fluctuation of the current IH that can be caused by an inverted electromotive power generated at the moment when the current IH changes the direction. A capacitor 24, which is connected in parallel to the coil 12a, is a bypass capacitor for preventing a high-frequency noise on the current IH.

Resistances 25 and 26, which are connected in series between the switching transistor 13 and 14, on one hand, and the coil 12a, on the other hand, function as constant resistances for regulating the magnitude of the current IH. The resistances 25 and 26 have a value at least several times as large as the impedance of the coil 12a, so that affection of the inductance component of the coil 12a on the current IH is reduced to a minimum. This is effective for maintaining the current IH stable.

Figure 10:
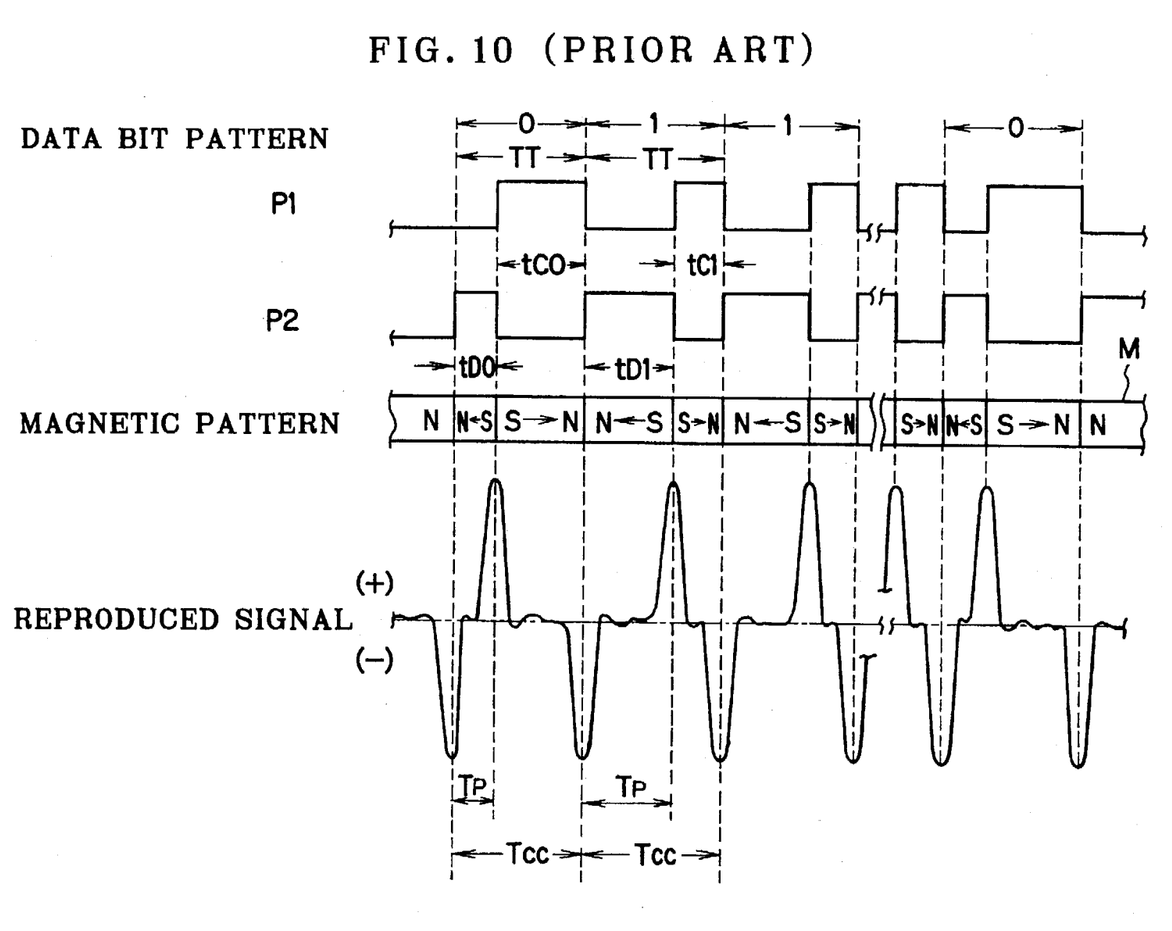
FIG. 10 is a timing chart illustrating a magnetic recording according to a conventional method.

FIG. 10 shows an example of conventional magnetic recording of binary code data. Each bit of the binary code data is recorded as a bit segment having a constant length in the longitudinal direction of a magnetic recording track M on the photo film. Each bit segment is constituted of a forward magnetic zone and a succeeding reversed magnetic zone. An analog signal reproduced from the recorded magnetic pattern has a positive curve for the forward magnetic zone, and a negative curve for the reversed magnetic zone, so that a positive peak is generated when the magnetizing direction is changed to the reverse, and a negative peak is generated when the magnetizing direction is changed to the forward.

A negative peak is regarded as a clock signal, and a positive peak generated between two adjacent clock signals is regarded as a data signal. Whether the data signal represents binary "1" or "0" is discriminated according to the position of the data signal relative to the two adjacent clock signals. In this example, if the data signal is nearer to the preceding clock signal, the data signal is considered to represent binary "0". If the data signal is nearer to the succeeding clock signal, the data signal is considered to represent binary "1". In other words, the border between the two inverted magnetic zones within the bit segment varies depending upon the binary value.

Accordingly, the second pulse signal applied to the second port P2 has a larger width tD1 for recording a binary "1", and a smaller width tD0 for recording a binary "0". The first pulse signal applied to the first port P1 has an inverted phase to the second pulse signal, so that the first pulse signal has a smaller width tC1 for recording binary "1". For binary "0", the first pulse signal has a larger width tC0. The sum "tD1+tC1" or "tD0+tC0" represents a time interval TT for recording each bit segment. Hereinafter, the time interval TT will be referred to as "bit recording interval". If the transporting speed of the photo film relative to a magnetic head for reading is unchanged from the film advancing speed used for recording, the bit recording interval TT coincides with a spacing Tcc between two adjacent clock signals of the reproduced signal. Hereinafter, the spacing Tcc will be referred to as "clock interval".

If a spacing Tp between a data signal and a preceding clock signal satisfies the condition: Tp/Tcc×100%>50%, then the data signal represents "1". If Tp/Tcc×100%<50%, then the data signal represents "0". Hereinafter, "Tp/Tcc× 100%" will be referred to as "data position". It is alternatively possible to predetermine that Tp/Tcc×100%>50% corresponds to binary "0", and Tp/Tcc×100%<50% to "1". In either case, the value Tp/Tcc ideally equal to either tD1/TT or to tD0/TT, and tD0/TT is equal to (TT−tD1)/TT. Therefore, in the following description, "tD1/TT×100%" will be referred to as "pulse position factor" that determines the data position Tp/Tcc×100% for both binary values.

3. Problems to be Solved by the Invention

Since the bit segments conventionally have a constant length, the bit recording interval TT is determined according to the number of bits to be recorded in a unit length of the magnetic recording track and the film advancing speed on recording. In general, the number of bits recorded in a unit length, hereinafter referred to as "bit density", is predetermined constant for the same magnetic recording media including the above described magnetic recording layer on photo film.

Since the binary code data of one frame should be recorded in a limited length of the magnetic recording layer which is assigned to each frame, the bit density as a predetermined constant value must be determined such that the largest number of data pieces that are expected to be recordable for one frame can be recorded within the limited length. In other words, the bit density must be such a value that permits recording within the limited length the largest number of bits that the binary code data of one frame can have.

However, the higher the bit density, the shorter each of the bit segments becomes, so that a little change in the film advancing speed would cause the larger change in the length ratio between the forward and reverse magnetic zones of one bit segment. For instance, even though the pulse signals tD1 and tC1 are applied for recording binary "1", the data position can be shifted to 50% or less by the change in length of the magnetic zones. Similar problem can arise on reading. Because the higher bit density makes the clock interval the shorter, it becomes more difficult to discriminate the data position between binary "0" and "1". Moreover, because the amplitudes of the clock signal and the data signal decrease as the magnetic zones become shorter, it is possible that any of the bit segments becomes so short that the associated clock signal or data signal cannot have enough amplitude to decode it.

On the other hand, it seems more likely that ordinary photographers would record a few pieces of recordable photographic data per frame in most photographic situations. That is, for most frames, it is considered unnecessary to record the largest possible bits. Using the high bit density for every frame with the risk of recording and decoding errors as above is therefore unnecessary rather disadvantageous for most frames.

OBJECT OF THE INVENTION

In view of the foregoing, a prime object of the present invention is to provide a method of magnetically recording binary code data on photo film, and a magnetic recording device therefor, by which the binary code data can be recorded at an optimum bit density for each frame, so that the binary code data may not suffer from the recording and decoding errors, such as those caused by the change in film transporting speed relative to the magnetic head.

SUMMARY OF THE INVENTION

To achieve the above and other objects, according to the present invention, a magnetic recording method for recording binary code data on magnetic recording tracks formed with a constant length on photo film comprises the steps of:

A. determining a total number of bits of binary code data to be recorded on one of the magnetic recording tracks;

B. determining a bit density that represents the number of bits to be recorded per unit length, such that the bit density decreases as the total number of bits determined in step A decreases; and C. recording each bit of the binary code data on the one magnetic recording track at the bit density determined in step B.

Since the risk of recording and decoding errors increases with the increase of the bit density, and ordinary photographers probably record several pieces of recordable photographic data per frame in most photographic situations, setting the bit density as low as possible in accordance with the total bit number to be recorded is advantageous to reduce the occurrence of errors, such as those caused by the change in film transport speed relative to the magnetic head.

In a magnetic recording method for recording binary code data on magnetic recording tracks, wherein each bit of the binary code data is recorded as a bit segment constituted of a first kind magnetic zone magnetized in a first direction and a second kind magnetic zone magnetized in reverse to the first direction and disposed behind the first kind magnetic zone, and the first kind magnetic zone has a shorter length of less than 50% of the bit segment or a longer length of more than 50% of the bit segment depending upon which binary value is assigned to the bit segment, whereas the second kind magnetic zone has a longer or a shorter length that is given by subtracting the shorter or the longer length of the first kind magnetic zone from the length of one bit segment, respectively, the present invention provides the steps of:

A. detecting a total number of bits of binary code data to be recorded on one of the magnetic recording tracks;

B. determining a bit density that represents the number of bits to be recorded per unit length, such that the bit density decreases as the total number of bits determined in step A decreases;

C. determining the length of each bit segment in correspondence with the bit density for the one magnetic recording track; and D. adjusting the percentage in length of the first kind magnetic zone to be closer to 50% of the bit segment for both binary values, as the bit density increases.

It is preferable to adjust the percentage in length of the first kind magnetic zone such that the shorter lengths of the first and second kind magnetic zones are maintained unchanged independently of the bit density.

Determining the percentage of the first kind magnetic zone to be closer to 50% as the bit density A becomes higher so as to maintain the shorter magnetic zone to have a sufficient length, preferably a constant length, regardless of the bit density, is effective to minimize the above described decoding errors such as interference or azimuth.

BRIEF DESCRIPTION OF THE DRAWINGS

Other objects and advantages of the present invention will become apparent in the following detailed description of the preferred embodiments when read in connection with the accompanying drawings, wherein like reference numerals designates like or corresponding parts throughout the several views, and wherein.

DETAILED DESCRIPTION OF THE PREFERRED EMBODIMENTS

Figure 1:
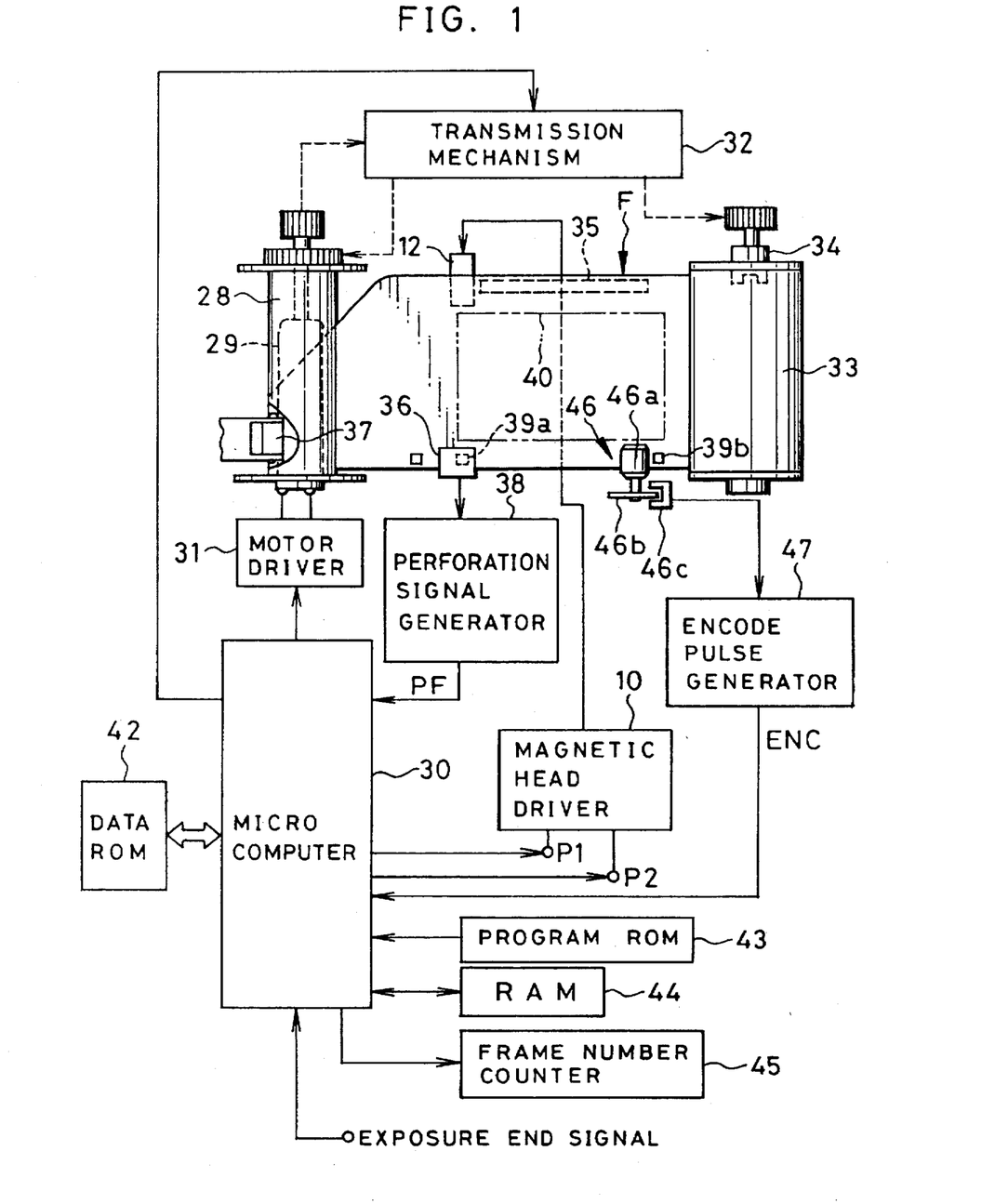
FIG. 1 schematically shows the overall structure of a magnetic recording device according to an embodiment of the present invention, wherein binary data is recorded on a magnetic recording track that is provided for each frame on a photo film.

Referring to FIG. 1 showing the overall structure of a camera having a magnetic recording device according to an embodiment of the invention, a motor 29 is mounted in a take-up spool 28, and driven by a motor driver 31 under the control of a microcomputer 30. Also, a transmission mechanism 32 is controlled by the microcomputer 30 to transmit the power of the motor 29 either to the take-up spool 28 or to a fork 34. When the take-up spool 28 is rotated by the motor 29, a filmstrip F is wound up onto the take-up spool 28. When the fork 34 is rotated by the motor 29, the filmstrip F is rewound into a cassette 33.

The base surface of the filmstrip F is entirely coated with a transparent magnetic recording layer, of which a predetermined area is utilized as a magnetic recording track 35 on which photographic information, such as a shutter speed and an aperture value, is recorded in form of binary code data. The filmstrip F has a pair of perforations 39a and 39b per frame which are arranged along a side edge of the filmstrip to designate a leading end and a trailing end of each frame. The magnetic recording track 35 extends along the opposite side edge of the filmstrip F from the perforations 39a and 39b between the leading and trailing ends of each frame.

A reflection type photosensor 36 is disposed on the passageway of the filmstrip so as to detect the perforations 39a and 39b. Each time the photosensor 36 detects two perforations, the motor 29 stops being driven. Thus the filmstrip F is advanced by one frame at a time. The outer periphery of the take-up spool 28 is wrapped with a rubber sheet, and a roller 37 is in frictional contact with the outer periphery of the take-up spool 28, so that a leading end of the filmstrip F is nipped between the roller 37 and the take-up spool 28, to be wound onto the take-up spool 28.

The photosensor 36 outputs a photoelectric signal to a perforation signal generator 38, which outputs a perforation signal PF to the microcomputer 30. The microcomputer 30 stops driving the motor 29 responsive to every second perforation signal PF, so as to advance the filmstrip F by one frame and position a frame behind an exposure aperture 40 of a camera.

A magnetic head 12 for data recording is disposed in a circumferential position of the exposure aperture 40, on the opposite side from the photosensor 36. The magnetic head 12 is driven by a magnetic head driver 10 during the one-frame advancing of the filmstrip F, to magnetically record the binary code data representing photographic information onto the magnetic recording track 35. The magnetic head driver 10 has the same construction as shown in FIG. 9. Binary code data recordable on the magnetic recording track 35 is previously stored in a data ROM 42, which is connected to the microcomputer 30.

The photographer can select any of the photographic information to record as a combination of binary code data pieces for each frame. According to the selected photographic data pieces, the total bit number per frame varies. The total bit number per frame is the total number of bits to be recorded in each track 35, including the bit number of other binary code data than the photographic data, such as parity check data.

A program ROM 43 stores a control sequence for the motor 29 and the transmission mechanism 32, a sequence program for controlling the magnetic recording, and so forth. The sequence of magnetic recording includes those processes which are specific to the present invention and are executed at the beginning and the end of the recording on each magnetic recording track 35, as set forth later. A RAM 44 is used as a working area for temporarily storing control data necessary for the photographing sequence and the magnetic recording sequence. The RAM 44 is also written with the data to be recorded on the magnetic recording track 35 prior to the magnetic recording. A frame number counter 45 is counted up one by one upon every second perforation signal PF after an initial or first frame of the filmstrip F is positioned behind the exposure aperture 40. The count of the frame number counter 45 represents the number of exposed frames.

According to the invention, the bit density changes frame by frame according to the total bit number per frame. That is, the binary code data pieces are recorded with the same bit density on the same track 35, so that the length of each bit recording area is constant within the same track 35. But the greater the total bit number per frame, the shorter the bit recording area of the associated track 35 becomes.

An encoder or speed sensor 46 is provided for detecting the advancing speed of the filmstrip F. The encoder 46 is constituted of a roller 46a rotated along with the filmstrip F being advanced, an encode plate 46b having a plurality of radial slits and rotating with the roller 46a, and a photosensor 46c. The photosensor 46c detects the slits of the encode plate 46b while the roller 46a and the encode plate 46b rotate, to output an intermittent photoelectric signal to an encode pulse generator 47. The encode pulse generator 47 outputs an encode pulse ENC in response to the intermittent photoelectric signal, that is, each time the filmstrip F is advanced by a unit length. The encode pulse ENC is inputted in the microcomputer 30.

It is possible to couple the same encode plate as the encode plate 46b to a rotary shaft of the motor 29 or a gear driven by the motor 29, to obtain a photoelectric signal which is synchronous with the rotation of the motor 29. However, such a synchronous signal have no bearing with the diameter of the filmstrip F rolled on the take-up spool 28, so that the synchronous signal does not completely represent the advanced length of the filmstrip F. By correcting the synchronous signal with a correction value to take the film roll diameter or the number of exposed frames into account, an encoder pulse could be generated which virtually represents that the filmstrip F is advanced by the unit length.

Figure 2:
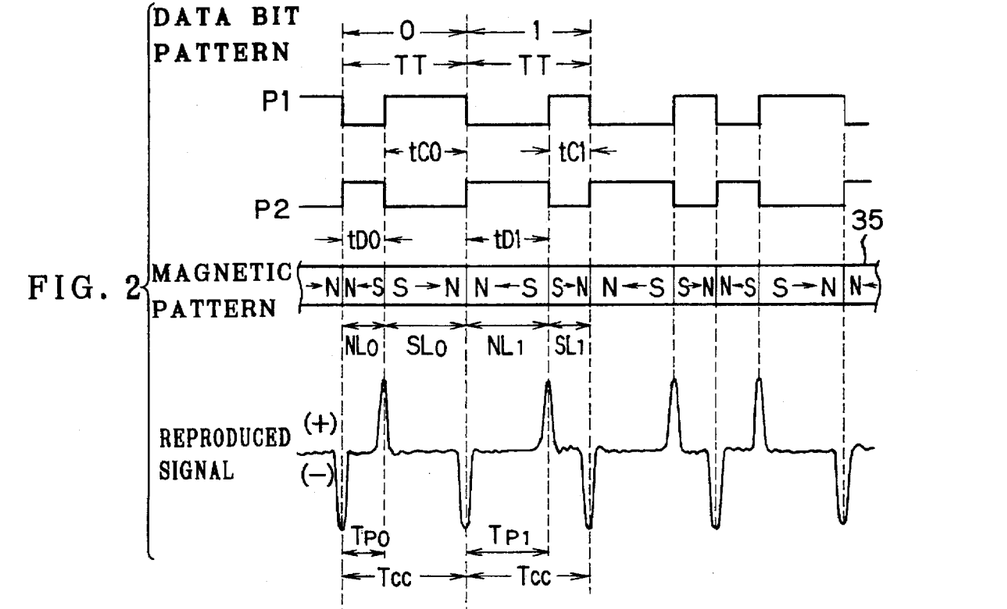
FIGS. 2 and 3 show timing charts illustrating the operation of the magnetic recording device.
Figure 3:
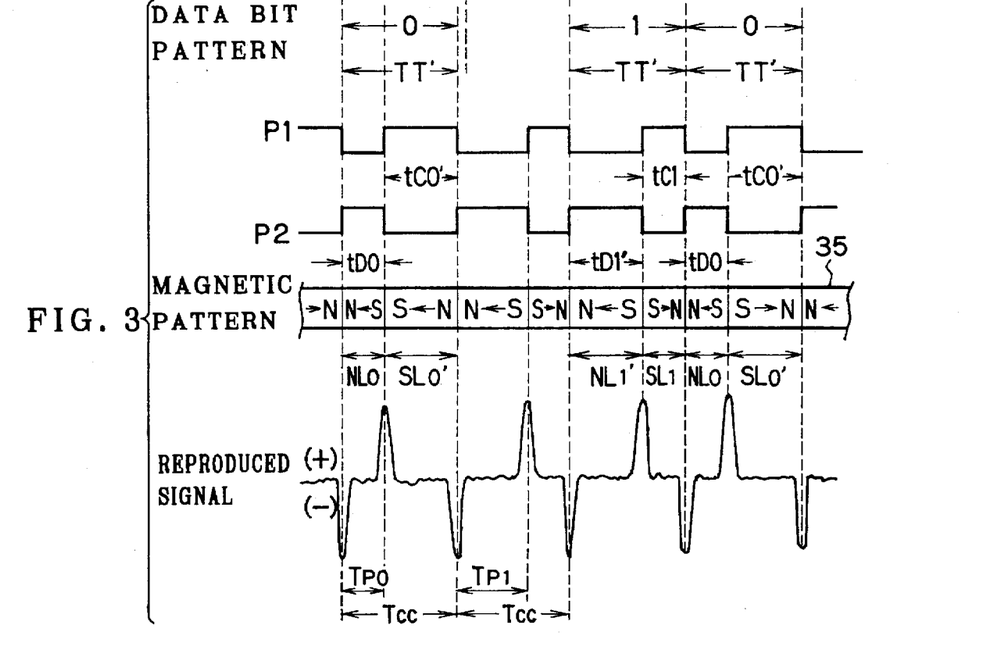

As shown in FIG. 2, the binary code data representing the photographic information is recorded in series along a magnetic recording track 35 in form of a magnetic pattern. The recording track 35 extends in a longitudinal direction of the filmstrip F on a lateral side of each frame. In one track 35, each bit of the binary code data is recorded as a bit segment, and each bit segment is constituted of a forward magnetic zone and a succeeding reverse magnetic zone, in the same way as conventional. In FIG. 2, for the sake of clarity, a bit recording interval TT and a corresponding clock interval Tcc are illustrated to be equal to each other. Also, the physical length of each bit segment is illustrated to be equal to the corresponding time interval TT or Tcc. The length NL of the forward magnetic zone is the advanced length of the filmstrip F in the time interval tD in which a second pulse signal is applied to a second port P2. The length SL of the reverse magnetic zone is the advanced length of the filmstrip F in the time interval tC in which a first pulse signal is applied to a first port P1. The length "NL+SL" of one bit segment is constant within the same magnetic recording track 35, and is determined according to a bit density A. The bit density A is calculated according the total number of bits to be recorded in that track 35, as will be described in detail below. That is, the higher the bit density A, the shorter the length of the bit segment. Proportionally, the bit recording interval TT decreases with the increase of the bit density A even when the film advancing speed is constant. FIG. 3 shows a case where the binary code data is recorded at a higher bit density in comparison with FIG. 2. As shown by TT', the bit recording interval of FIG. 3 is shorter than that of FIG. 2.

Independently of the bit density A, if the bit segment is assigned to binary "1", the length NL of the forward magnetic zone is longer than the length SL of the reverse magnetic zone. If, on the other hand, the bit segment is assigned to binary "0", the length NL is shorter than the length SL.

An analog signal reproduced from the recorded magnetic pattern has a positive curve for the forward magnetic zone, and a negative curve for the reversed magnetic zone, so that a positive peak is generated when the magnetizing direction is changed to the reverse, and a negative peak is generated when the magnetizing direction is changed to the forward.

A negative peak is regarded as a clock signal, and a positive peak generated between two adjacent clock signals is regarded as a data signal. Accordingly, a spacing Tp between a data signal and a preceding clock signal corresponds to the width tD of the second pulse. Whether the data signal represents binary "1" or "0" is discriminated according to the position of the data signal relative to the two adjacent clock signals.

If the data position Tp/Tcc×100% is more than 50%, then the data signal represents "1". If the data position Tp/Tcc× 100% is less than 50%, then the data signal represents "0". According to the present invention, not only the bit recording interval TT but also a pulse position factor B=tD1/TT× 100% is determined for each frame according to the bit density A. According to a preferred embodiment, the pulse position factor B is determined according to the following equation:

$$B = -0.84 \times A + 100.2 \quad (1)$$

As described above, the pulse position factor B is a value that defines the data position Tp/Tcc, i.e. the position of the data signal relative to the preceding clock signal, for both binary values. According to the present invention, the pulse position factor B is equal to the larger pulse duty factor tD1/TT (×100%) or tC0/TT (×100%) of the pulse signals applied to the magnetic head driver 10. That is, the pulse position factor B is equal to the data position Tp1/Tcc (×100%) representative of binary "1" in this embodiment.

By determining the pulse position factor B according to the equation (1), the data position Tp/Tcc×100% is set closer to 50%, but of course not equal to 50%, as the bit density A becomes higher. On the other hand, the length SL1 or NL0 of the shorter one of the forward and reverse magnetic zones of each bit segment is maintained unchanged independently of the bit density A. In other words, the length of each bit segment is changed in accordance with the bit density A by changing the length SL0 or NL1 of the longer magnetic zone alone in correspondence with the pulse position factor B within the bit segment, for example as shown by tC0', SL0', tD1' and NL1' in FIG. 3 where the bit density is higher than FIG. 2.

Figure 4:
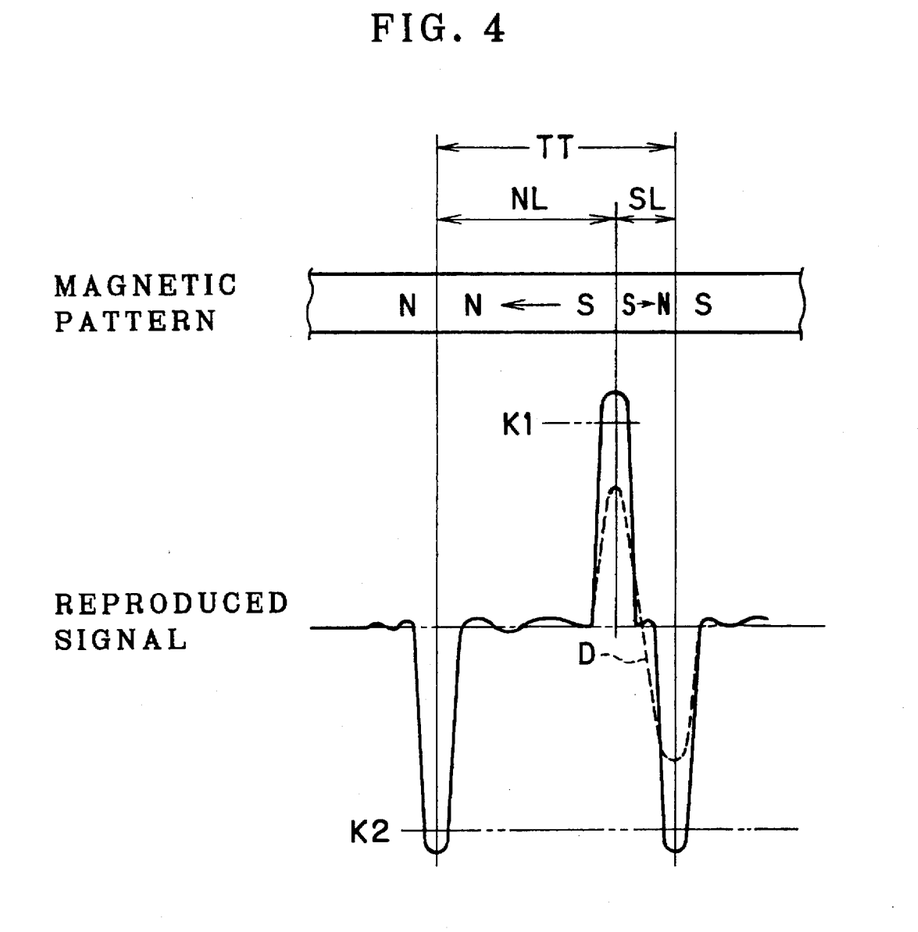
FIG. 4 is an explanatory view illustrating a reproduction error that may occur when a magnetic zone is too short.

This configuration is to prevent the shorter magnetic zone of each bit segment from being too short to reproduce the clock signals and the data signals with sufficient amplitudes. As shown, for example, in FIG. 4, if the pulse position factor B should be maintained constant while the bit density A increases, the lengths NL and SL of both magnetic zones would decrease with the decreasing length of one bit segment. If the shorter magnetic zone, the reverse magnetic zone in FIG. 4, is too short, interference or azimuth or other reproduction error would arise, so that the amplitudes of the data signal and the clock signal reproduced at both borders of this too short magnetic zone cannot reach respective threshold values K1 and K2, as is shown by dashed lines D. If the amplitude is below the threshold value K1 or K2, the reproduced signal is not recognized as the clock signal or the data signal.

Determining the pulse position factor B to be closer to 50% as the bit density A becomes higher and, at the same time, maintaining the shorter magnetic zones of each bit segment to have a constant sufficient length regardless of the bit density A, is effective to minimize the above described reproduction errors such as interference or azimuth.

Moreover, as described above, since the risk of recording and decoding errors increases with the increase of the bit density, and ordinary photographers probably record several pieces of recordable photographic data per frame in most photographic situations, setting the bit density as low as possible in accordance with the total bit number is advantageous to reduce the occurrence of errors, such as those caused by the change in film transport speed relative to the magnetic head 12.

The operation of the above magnetic recording device will now be described with reference to FIGS. 2, 3, 5A and 5B.

Figure 5A:
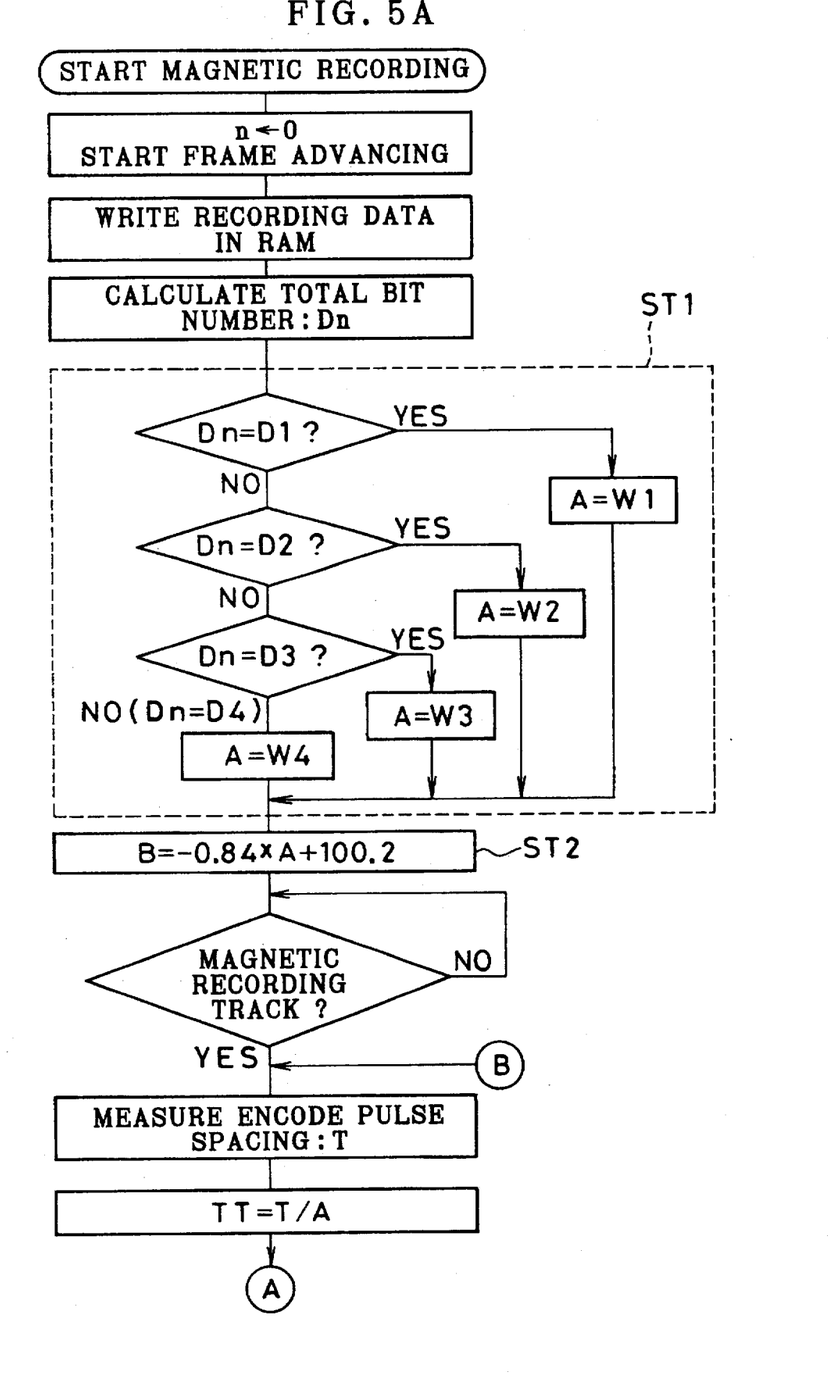
FIGS. 5A and 5B show a flow chart illustrating the operation of the microcomputer of the magnetic recording device.

At the end of an exposure, an exposure end signal is inputted to the microcomputer 30, which then resets "bit recording number n" to zero, and starts driving the motor 29 through the motor driver 31 for the one-frame advancing of the filmstrip F. The bit recording number n indicates the number of bits having been recorded on the magnetic recording track 35 during the one-frame advancing.

Thereafter the microcomputer 30 refers to the data ROM 42 to convert photographic information about the just exposed frame into binary code data, and write it with binary code of parity check data as recording data in a predetermined address of the RAM 44. Simultaneously, the microcomputer 30 calculates the total bit number Dn of the binary code data to be recorded for that frame.

In the next step ST1, the microcomputer 30 determines a bit density A in correspondence with the calculated total bit number Dn. In this embodiment, the total bit number Dn is designed to have one of four predetermined values D1, D2, D3 and D4, and the bit density A is selected among from four predetermined values W1, W2, W3 and W4 which are stored in the program ROM 43. These values W1 to W4 are determined such that the binary code data of one frame may be recorded in the substantially entire length of the magnetic recording track 35 whichever value D1, D2, D3 or D4 is selected as the total bit number A. For example, the predetermined total bit numbers are D1=49 byte, D2=52 byte, D3=55 byte, and D4=58 byte, whereas the corresponding bit densities W1, W2, W3 and W4 are 21 bit/mm, 22 bit/mm, 23 bit/mm and 24 bit/mm, respectively.

If the calculated bit density Dn is D2, then the bit density A is determined to be W2. In the next step ST2, the microcomputer 30 calculates a pulse position factor B according to the following equation:

$$B=-0.84 \times A+100.2 \quad (1)$$

As described above, the pulse position factor B is a value that defines the data position Tp/Tcc, i.e. the position of the data signal relative to the preceding clock signal, for both binary values. According to the present invention, the pulse position factor B is equal to the larger pulse duty factor tD1/TT ($\times 100\%$) or tC0/TT ($\times 100\%$) of the pulse signals applied to the magnetic head driver 10. That is, the pulse position factor B is equal to the data position Tp1/Tcc ($\times 100\%$) representative of binary "1" in this embodiment.

Determining the pulse position factor B according to the equation (1), the data position Tp/Tcc$\times 100\%$ is set closer to 50%, but of course not equal to 50%, as the bit density A becomes higher. On the other hand, the length SL1 or NL0 of the shorter one of the forward and reverse magnetic zones of each bit segment is maintained unchanged independently of the bit density A. In other words, the length of each bit segment is changed in accordance with the bit density A by changing the length SL0 or NL1 of the longer magnetic zone alone in correspondence with the pulse position factor B within the bit segment, for example as shown by tC0', SL0', tD1' and NL1' in FIG. 3 where the bit density is higher than FIG. 2. Thus, the above described decoding errors such as interference or azimuth are minimized.

Simultaneously with the start of one-frame advancing, the microcomputer 30 begins to receive the encode pulse ENC one for every 1 mm advance from the encode pulse generator 47. The microcomputer 30 counts up the encoder pulses ENC so as to determine if a leading end of the magnetic recording track 35 moves to the magnetic recording head 12. Each time the filmstrip F has been advanced by a given length, the microcomputer 30 detects an encoder pulse spacing T between the latest encoder pulse ENC and the preceding encoder pulse ENC. The encoder pulse spacing T principally corresponds to the unit length of the filmstrip F, so that the bit recording interval TT is calculated by dividing the value T by the bit density A. Thus, the bit recording interval TT is adjusted to the film advancing speed and the bit density A.

Then the recording data starts being read serially from the RAM 44, and each bit of the recording data is checked as to whether it is binary "1" or "0". Depending on the binary value of the bit to be recorded at the moment, a pulse width tC of the first pulse signal to be applied to the first port P1 and a pulse width tD of the second pulse signal to be applied to the second port P2 of the magnetic head driver 10 are determined. Specifically, for the binary "1", the pulse width tD is calculated according to an equation tD=TT$\times$B=tD1, whereas the pulse width tC is calculated according to an equation tC=TT$\times$(100-B)=tC1. On the other hand, the pulse width tD is calculated according to an equation tD=TT$\times$(100-B)=tD0, whereas the pulse width tC is calculated according to an equation tC=TT$\times$B=tC0.

Figure 5B:
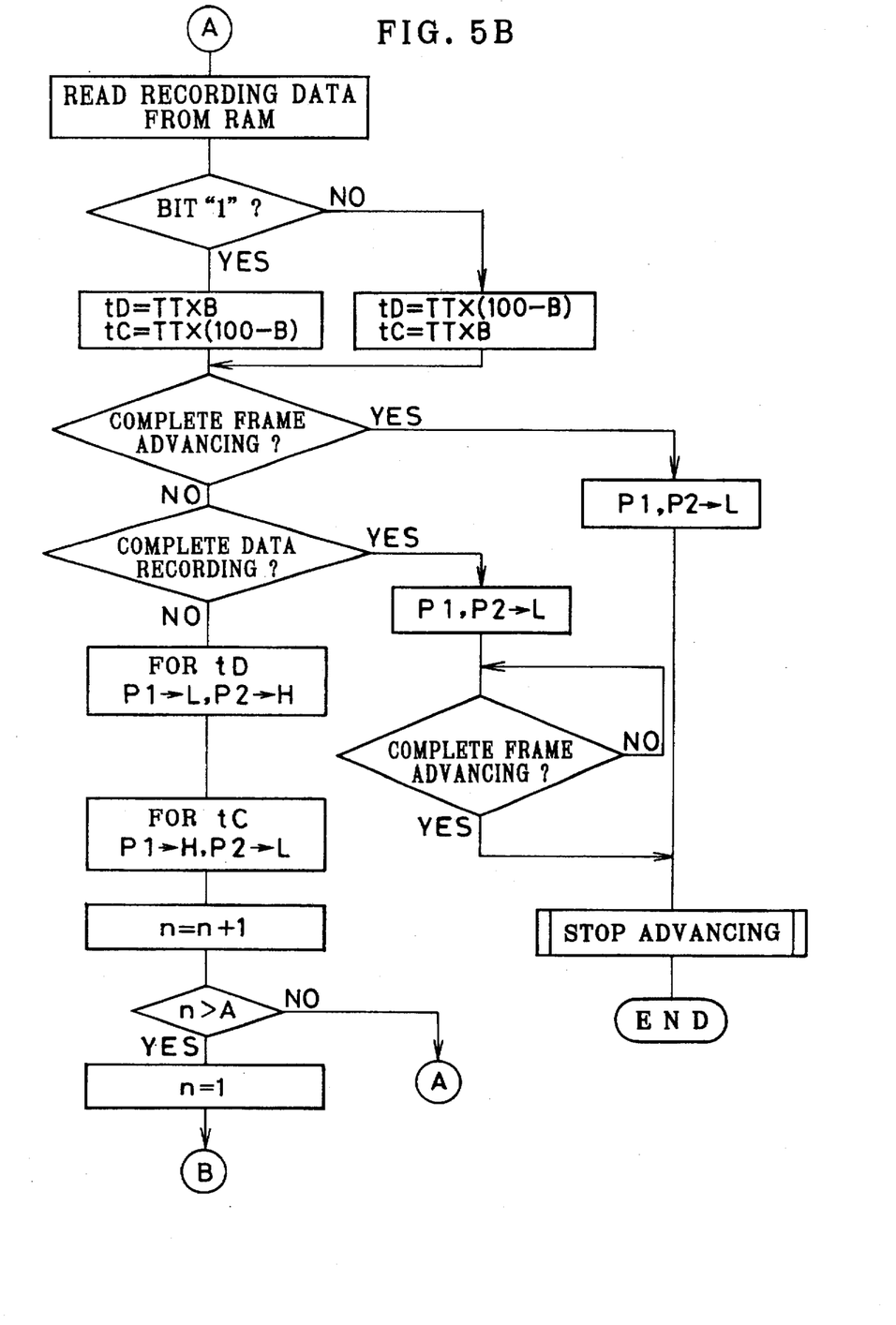

After confirming that the filmstrip F has not yet advanced by one frame and that the binary code data has not completely been recorded, the microcomputer 30 applies the second pulse signal of the determined pulse width tD0 or tD1 and then the first pulse signal of the determined pulse width tC0 or tC1 respectively to the second and first ports P2 and P1.

After the first bit segment is thus recorded, the bit recording number n is incremented by one, and the incremented bit recording number n is compared with the bit density A. The comparison with the bit density A is for periodically checking whether the bit recording interval TT should be revised or not. For example, when the value A=23, the encoder pulse spacing T is measured again after every recording of 23 bits, so as to revise the bit recording interval TT if necessary. In this way, even when the advancing speed of the filmstrip F should fluctuate due to slipping of the roller 46a on the filmstrip F, for example, the bit recording interval TT is adjusted sooner to maintain the magnetic zones in the predetermined lengths.

Thereafter, the second bit of the recording data is read out from the RAM 44, and the second bit segment is recorded in the same sequence as the first bit segment. Since the second bit is "1" in the example of FIG. 2, a second pulse signal having the width tD1 and then a first pulse signal having the width tC1 are sequentially applied to the second and first ports P2 and P1, respectively. The third and following bits of the recording data are recorded in the same way as for the second bit.

When it is determined that the last bit of the recording data has been recorded, both ports P1 and P2 are set to be low level. When a perforation signal PF is generated from the perforation signal generator 38 to indicate the completion of one-frame advancing, the microcomputer 30 stops the motor 29 and stands by the next exposure.

Since the total bit number recorded during the one-frame advancing is determined to be recordable within the magnetic recording track 35, the filmstrip F would not normally be advanced one frame until the recording data of one frame has been recorded. However, the filmstrip F can accidentally be advanced one frame before the completion of the magnetic recording. To coop with that case, the magnetic recording sequence includes a step of interrupting driving the magnetic head 12 and the motor 29. After the interruption, it is preferable to rotate the motor 29 reversely to move the filmstrip F back to the recording start position where the magnetic head 12 faces the leading end of the magnetic recording track 35. Thereafter, the magnetic head 12 starts magnetic recording again from the first bit of the recording data, while reading the recording data from the RAM 44.

The photographer can change the contents and the combination of photographic data pieces to be recorded for the next frame by entering appropriate commands prior to the shutter release operation. In response to an exposure end signal generated after the exposure, the filmstrip F is advanced by one frame, while the photographic data is magnetically recorded on the magnetic recording track 35 of the just exposed frame, in the same way as above. At that time, the total bit number Dn of the revised photographic data is calculated to select one of the values W1 to W4 as a bit density A for this frame in accordance with the total bit number Dn. Then, a pulse position factor B is calculated again in accordance with the new bit density A. Also, a bit recording interval TT is calculated based on the encode pulse spacing T, so as to drive the magnetic head 12 with the pulse signals whose pulse widths tD and tC are defined by the newly calculated pulse position factor B.

In this way, the binary code data is recorded on each magnetic recording track 35 at an optimum bit density that varies depending upon the total bit number to be recorded for each frame.

Although the bit density A is changed gradually by four steps in accordance with four variations of possible total bit number in the above embodiment, it is possible to predetermine more than or less than four variations in possible total bit number and corresponding bit density.

Figure 6:
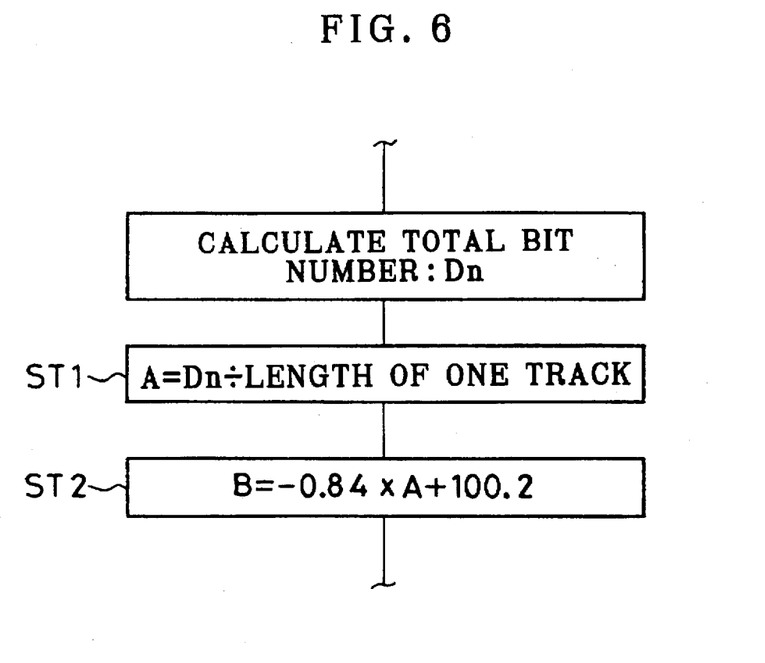
FIG. 6 shows a portion of a flow chart, illustrating the step of determining the recording density in accordance with the total bit number per track, according to another embodiment of the invention.

It is also possible to change the bit density A proportionally to the total bit number, as is shown in FIG. 6. In this embodiment, the bit density A is calculated by dividing the total bit number Dn by the length (mm) of the magnetic recording track 35.

Figure 7:
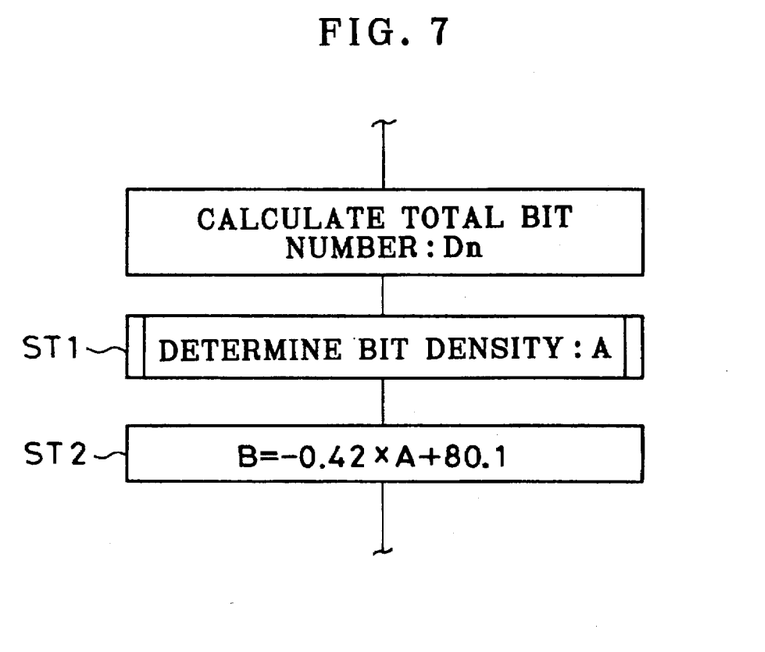
FIG. 7 shows a portion of a flow chart, illustrating the step of determining the pulse position factor in accordance with the recording density, according to another embodiment of the invention.

FIG. 7 shows another preferred embodiment of the present invention, wherein the pulse position factor B is determined according to the following equation:

$$B = -0.42 \times A + 80.1 \qquad (2)$$

Other steps and constructions may be equivalent to those of the first embodiment. This embodiment permits optimizing the pulse position factor B in view of prevention against the recording and decoding errors that may be caused by the fluctuation in film transport speed relative to the magnetic head.

As described above, the binary "1" or "0" is discriminated depending upon whether the data position Tp/Tcc×100% is more than 50% or less than 50%. If the pulse position factor B, i.e. the data position Tp1/Tcc×100% for binary "1" in this instance, is proximate 50%, e.g. 55%, the data position Tp1/Tcc×100% could easily be shifted to less than 50% by a small variation in the film transporting speed during recording as well as during reading. In that case, the data signal would be incorrectly decoded as binary "0". The same problem can equally arise with regard to the data position Tp0/Tcc×100(%)=100-B(%) for binary "0". Accordingly, it is necessary to set the pulse position factor B sufficiently away from 50%.

On the other hand, it is necessary to maintain the shorter magnetic zone of one bit segment to be not less than a certain length even at a higher bit density, in order to reproduce the clock and data signals with sufficient amplitudes.

Figure 8:
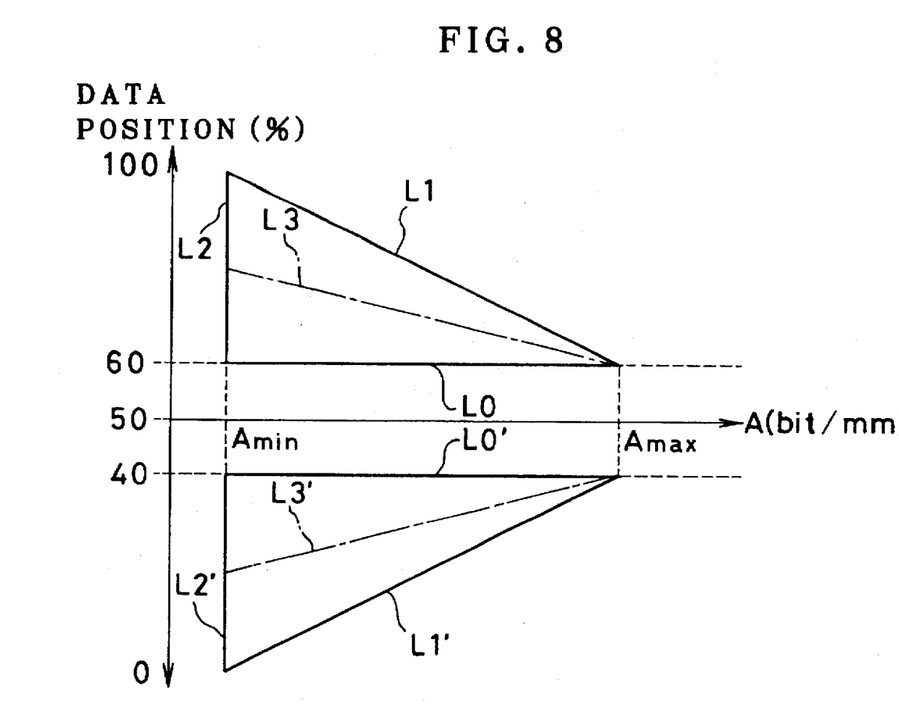
FIG. 8 shows a graph illustrating relationship between the recording density and the optimum pulse position.

FIG. 8 shows safety data position ranges for both binary values in relation to the bit density A, wherein an area surrounded by solid lines L0, L1 and L2 shows the safety data position range for binary "1" in this instance, and an area surrounded by solid lines L0', L1' and L2' shows the safety data position range for binary "0". The lines L0 and L0' represent the closest limits of the data position to 50%. In this instance, the closest limits of data position to 50% are set at 60% and 40% for binary "1" and "0", respectively. That is, there is a spacing of 10% for either binary value from the data discrimination line of 50%. If the data position is set closer to 50% than these closest limits L0 and L0', a fluctuation in film transporting speed during recording or reading, or tolerance between decoder circuits tends to make the position of the reproduced data signal too close to the data discrimination line to decode it properly.

The lines L1 and L1' represent the farthest limits of the data position from 50%, beyond which the shorter magnetic zone cannot have a sufficient length, so the reproduction signals cannot have sufficient amplitudes enough to decode them. In this instance, the shortest limit of the shorter magnetic zone is set at 8 μm. As shown, the farthest limits come closer to 50% as the bit density A becomes higher and thus the length of one bit segment becomes shorter.

The lines L2 and L2' represent a minimum bit density Amin. A maximum bit density Amax is defined by the connecting points of the closest and farthest limits L0, L0', L1 and L1' of the data position relative to 50%.

It can be understood that an optimum data position for each binary value to each bit density is on a line L3 or L3' that extends in the center between the closest and farthest limits L0 and L1, or L0' and L1' of each safety data position range.

The above equation (2) is to calculate the pulse position factor B by which an optimum data position for each binary value is determined in accordance with the total bit number and thus the bit density that is determined according to the total bit number in the same way as in the first embodiment. The bit density may change either gradually or proportionally to the total bit number. Since the data position is set on the line L3 or L3', even when the film transporting speed fluctuates during recording or reading, the deviation of the data position can hardly beyond the safety range, so that the recording errors and the decoding errors are minimized.

Assuming that "B=Y×A+Z" represents an equation for determining the pulse position factor B, the coefficient Y may be "0>Y≧-0.84". To attach much importance to the shortest limit of the shorter magnetic zone, it is preferable to define the range of the value Y to be -0.42>Y≧-0.84. Then the data position would be more spaced from the farthest limits L1 and L1'. If, on the contrary, the value Y is defined to be 0>Y≧-0.42, the data position would be more spaced from the closest limits L0 and L0', so that the preventive effect against the accidental data inversion is ensured.

As described above, the present invention is applicable to a case where the data position of more than 50% represents binary "0", and the data position of less than 50% represents binary "1". The present invention is applicable not only to a magnetic recording device built in a camera, but also to a magnetic recording device for recording print order data and print condition data on a magnetic recording layer of developed photo film.

Thus, the present invention should not be limited to the above described embodiments but, on the contrary, various modifications may be possible to those skilled in the art without departing from the scope of the invention as defined by the appended claims.

What is claimed is:

1. A magnetic recording method for recording binary code data on magnetic recording tracks formed with a constant length on photo film, while moving said photo film in a direction relative to a magnetic head, said method comprising the steps of:

A. determining a total number of bits of binary code data to be recorded on one of said magnetic recording tracks;

B. determining a bit density that represents the number of bits to be recorded per unit length, such that the bit density decreases as the total number of bits determined in step A decreases; and C. recording each bit of said binary code data on said one magnetic recording track at the bit density determined in step B.

2. A magnetic recording method as claimed in claim 1, wherein the bit density is determined to be directly proportional to the total bit number.

3. A magnetic recording method as claimed in claim 1, further comprising the steps of:

D. determining in correspondence with the bit density a length of one segment to be allocated to one bit on said one magnetic recording track;

E. monitoring the moving speed of the photo film relative to the magnetic head; and F. driving the magnetic recording head to record one bit at a bit recording interval which is controlled in accordance with the length of one segment and the moving speed of the photo film, such that the length of one segment is maintained constant under the same bit density and in the same magnetic recording track.

4. A magnetic recording method for recording binary code data on magnetic recording tracks formed with a constant length on photo film, while moving said photo film in a direction relative to a magnetic head, each bit of said binary code data being recorded as a bit segment constituted of a first kind magnetic zone magnetized in a first direction and a second kind magnetic zone magnetized in reverse to said first direction and disposed behind said first kind magnetic zone, wherein said first kind magnetic zone has a shorter length of less than 50% of the bit segment or a longer length of more than 50% of the bit segment depending upon which binary value is assigned to the bit segment, whereas said second kind magnetic zone has a longer or a shorter length that is given by subtracting said shorter or said longer length of said first kind magnetic zone from the length of one bit segment, respectively, said method comprising the steps of:

A. detecting a total number of bits of binary code data to be recorded on one of said magnetic recording tracks;

B. determining a bit density that represents the number of bits to be recorded per unit length, such that the bit density decreases as the total number of bits determined in step A decreases;

C. determining the length of each bit segment in correspondence with the bit density for said one magnetic recording track; and D. adjusting the percentage in length of said first kind magnetic zone to be closer to 50% of the bit segment for both binary values, as the bit density increases.

5. A magnetic recording method as claimed in claim 4, wherein the percentage in length of said first kind magnetic zone is adjusted such that said shorter lengths of said first and second kind magnetic zones are maintained unchanged independently of the bit density.

6. A magnetic recording method as claimed in claim 4, wherein said longer length of said first kind magnetic zone is determined according to an equation:

$$B=-Y\times A+100.2$$

wherein B represents said longer length of said first kind magnetic zone in percentage of the length of one bit segment;

A represents the bit density; and

Y represents a coefficient, and $0<Y<0.84$.

7. A magnetic recording method as claimed in claim 4, wherein said longer length of said first kind magnetic zone is determined according to an equation:

$$B=-0.42\times A+80.1$$

wherein B represents said longer length of said first kind magnetic zone in percentage of the length of one bit segment; and A represents the bit density.

8. A magnetic recording method as claimed in claim 4, wherein the bit density is calculated by dividing the constant length of said magnetic recording tracks by the total number of bits to recorded on said one magnetic recording track.

9. A magnetic recording method as claimed in claim 4, further comprising the steps of:

E. monitoring the moving speed of the photo film relative to the magnetic head; and F. driving the magnetic recording head to record one bit at a bit recording interval which is controlled in accordance with the length of one bit segment and the moving speed of the photo film, such that the length of one bit segment is maintained constant under the same bit density.

10. A magnetic recording device for recording binary code data on magnetic recording tracks formed with a constant length on photo film, while moving said photo film in a direction relative to a magnetic head, each bit of said binary code data being recorded as a bit segment constituted of a first kind magnetic zone magnetized in a first direction and a second kind magnetic zone magnetized in reverse to said first direction and disposed behind said first kind magnetic zone, wherein said first kind magnetic zone has a shorter length of less than 50% of the bit segment or a longer length of more than 50% of the bit segment depending upon which binary value is assigned to the bit segment, whereas said second kind magnetic zone has a longer or a shorter length that is given by subtracting said shorter or said longer length of said first kind magnetic zone from the length of one bit segment, respectively, said magnetic recording device comprising:

means for detecting a total number of bits of binary code data to be recorded on one of said magnetic recording tracks;

means for determining a bit density that represents the number of bits to be recorded per unit length, such that the bit density decreases as the total number of bits decreases;

means for determining the length of each bit segment in correspondence with the bit density for said one magnetic recording track; and means for adjusting the percentage in length of said first kind magnetic zone to be closer to 50% of the bit segment for both binary values, as the bit density increases.

11. A magnetic recording device as claimed in claim 10, further comprising:

means for monitoring the moving speed of the photo film relative to the magnetic head;

means for driving the magnetic recording head to record one bit at a bit recording interval; and means for controlling said bit recording interval in accordance with the length of one bit segment and the moving speed of the photo film, such that the length of one bit segment is maintained constant under the same bit density.

* * * * *